Feb. 14, 1956   R. SIMS   2,734,237
VENTILATED AWNING
Filed Feb. 9, 1953   3 Sheets-Sheet 1
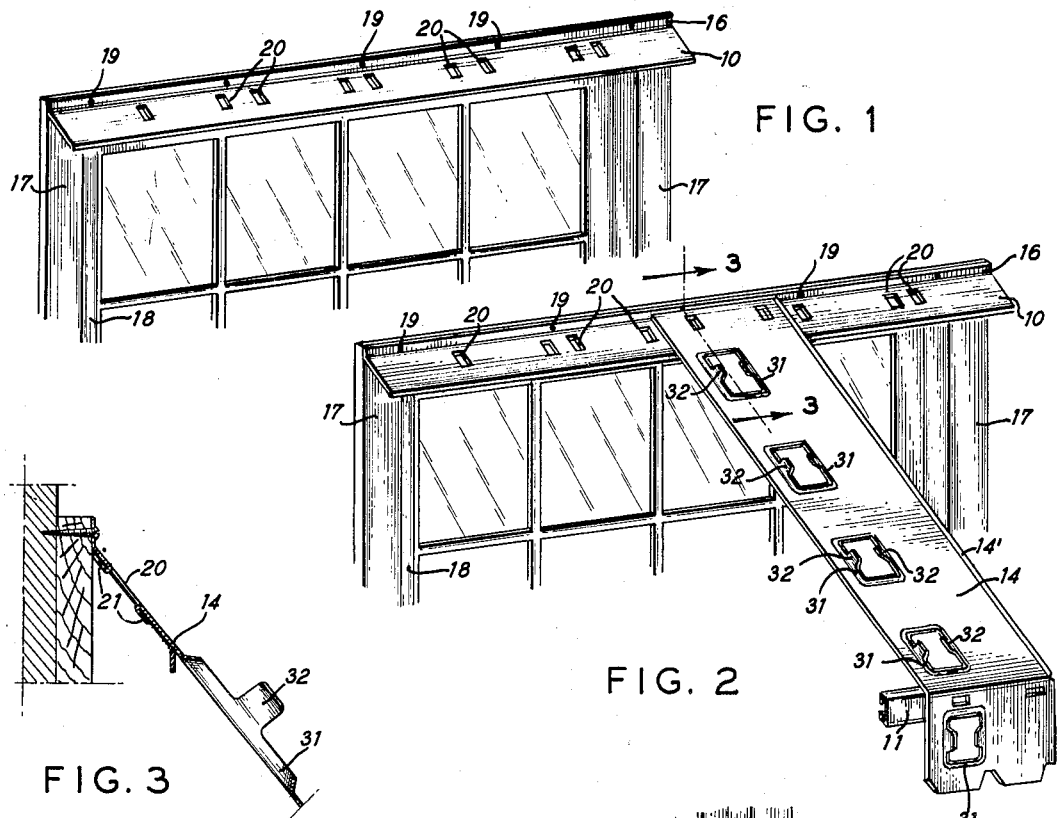
FIG. 1
FIG. 2
FIG. 3
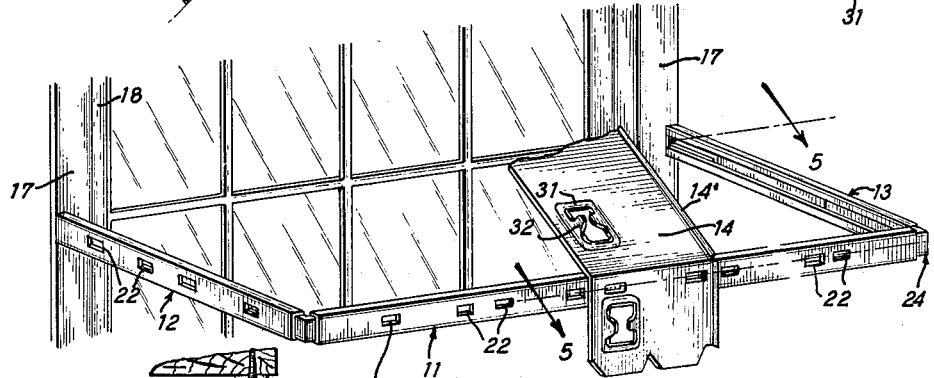
FIG. 4
FIG. 5
INVENTOR
REDDING SIMS
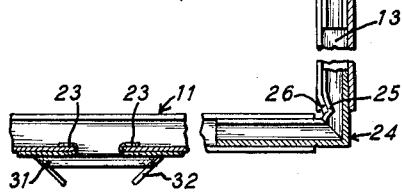
BY
ATTORNEY

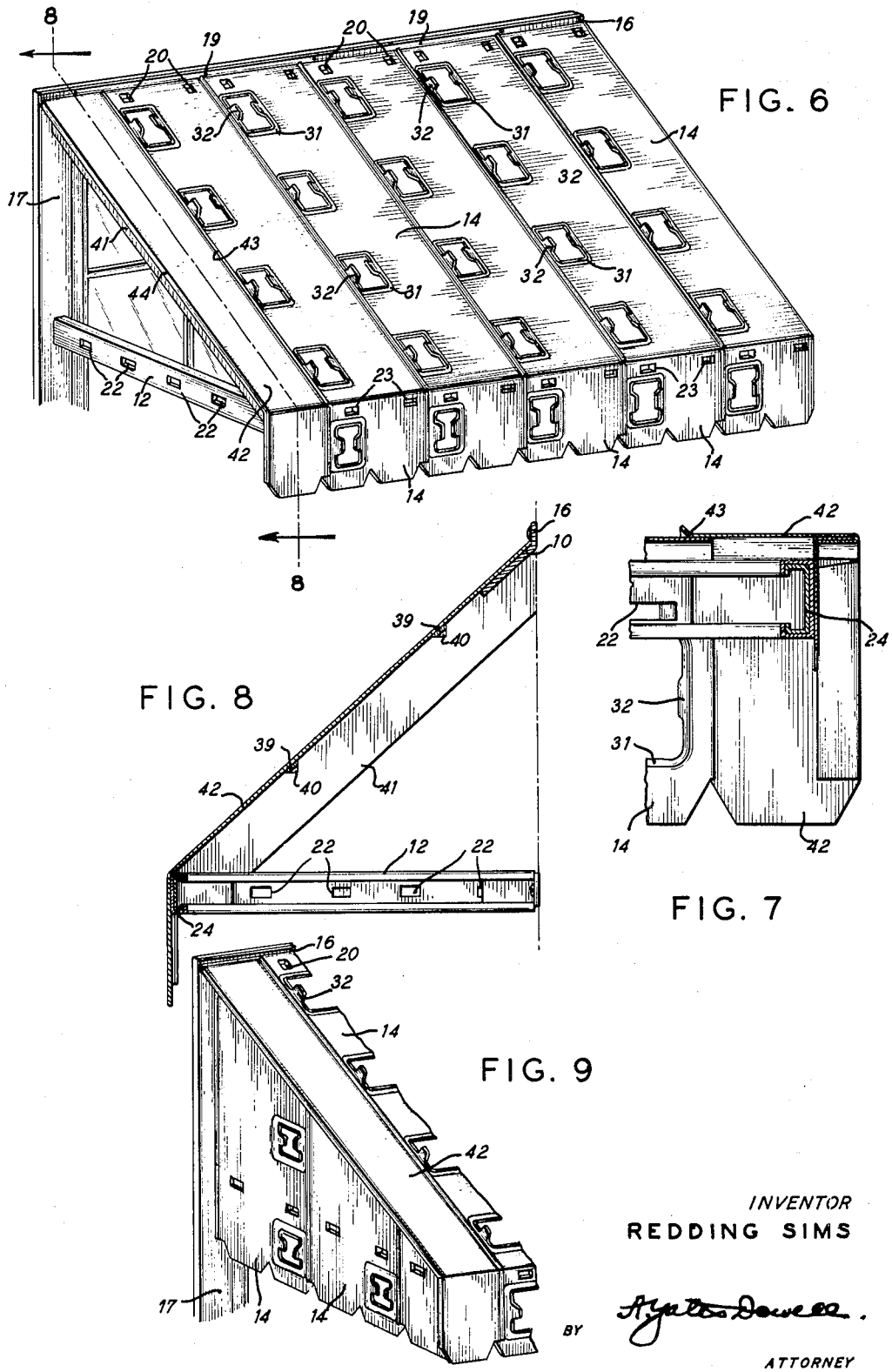

Feb. 14, 1956 R. SIMS 2,734,237
VENTILATED AWNING
Filed Feb. 9, 1953 3 Sheets-Sheet 3
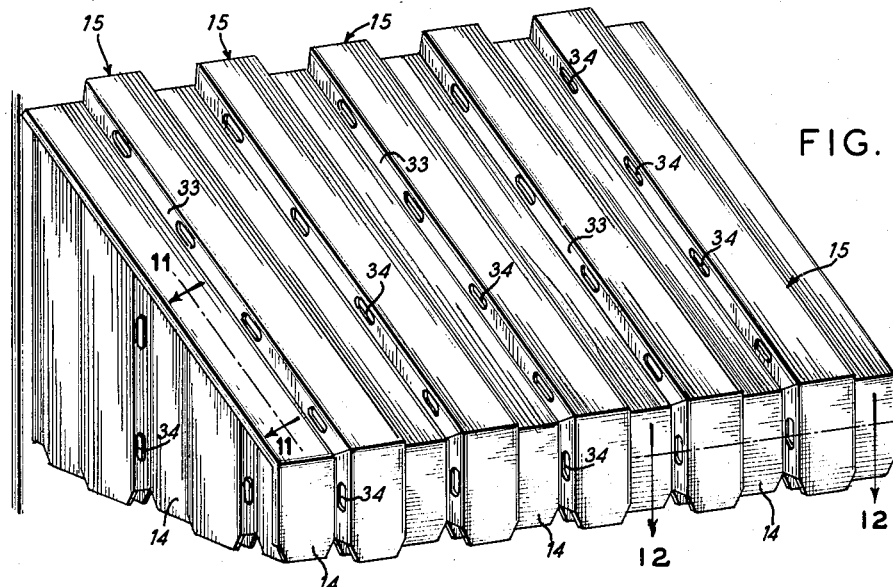
FIG. 10
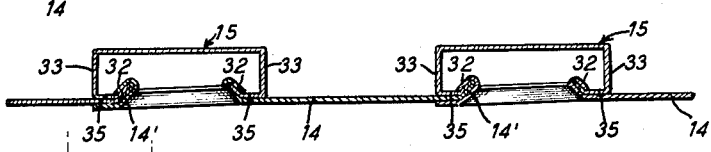
FIG. 12
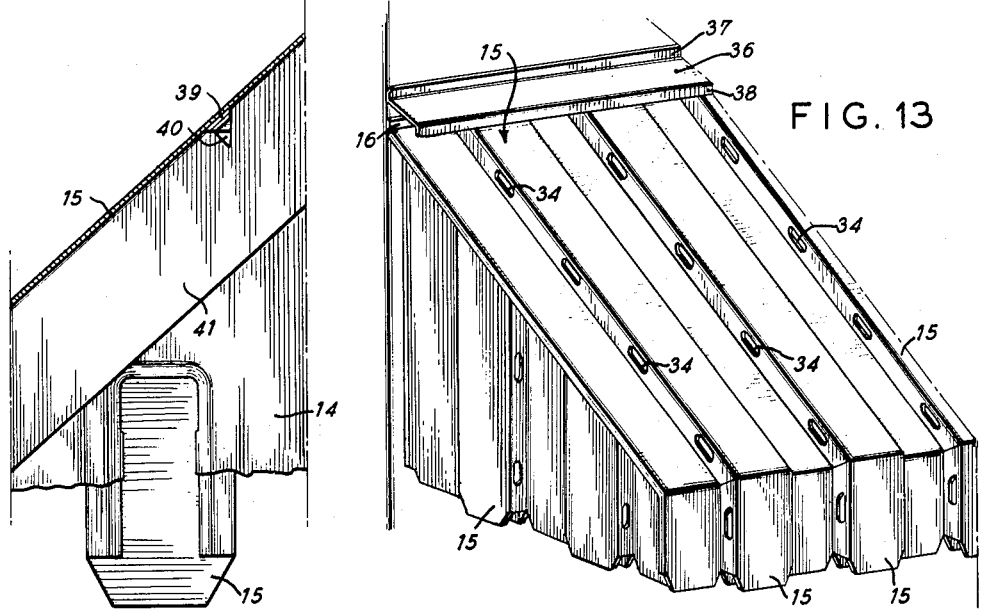
FIG. 13
FIG. 11
INVENTOR
REDDING SIMS United States Patent Office 2,734,237
Patented Feb. 14, 1956

2,734,237

VENTILATED AWNING

Redding Sims, New Orleans, La.

Application February 9, 1953, Serial No. 335,688

2 Claims. (Cl. 20—57.5)

This invention relates to awnings of the relatively rigid type of aluminum or other metal and which are not intended to be raised or lowered, but which exclude the weather including the shedding of water and are provided with ventilating openings for the circulation of air.

Awnings of this general character have not been entirely satisfactory for various reasons, including among other things the cost of the same, the expense of installation and the necessity of special equipment for use in the installation of the same.

It is an object of the invention to provide an awning of light weight and at a reduced cost, which will effectively protect against the elements including the shedding of water, but which will allow the passage of air therethrough, which is relatively sturdy and durable, as well as an awning which is easy to manufacture and transport and which can be quickly installed on location without special equipment.

Other objects and advantages of the invention will be apparent from the following description taken in connection with the accompanying drawings, wherein:

Fig. 1 is a perspective illustrating the first step in the assembly of a metal awning;

Fig. 2 a similar perspective showing the second step of such assembly;

Fig. 3, a section on the line 3—3 of Fig. 2;

Fig. 4, a further step in the assembly of a metal awning;

Fig. 5, a section on the line 5—5 of Fig. 4;

Fig. 6, a perspective view of the base of the awning completely assembled;

Fig. 7, a fragmentary view on an enlarged scale of an interior corner of the awning;

Fig. 8, a vertical section of the device as shown in Fig. 6 but with the mounting bar added;

Fig. 9, a fragmentary perspective of the device shown in Fig. 6, illustrating the addition of end members;

Fig. 10, a perspective view of the awning completely assembled;

Fig. 11, a detail section on the line 11—11 of Fig. 10;

Fig. 12, a detail section on the line 12—12 of Fig. 10; and

Fig. 13, a fragmentary perspective view of the completed awning as shown in Fig. 10, with the addition of waterproofing or weatherstripping at the upper reaches thereof.

Briefly stated, the awning of the present invention comprises a mounting bar by means of which the upper end of the awning is attached to a support and a frame member spaced from the mounting bar at a lower elevation. The mounting bar and frame member have spaced aligned apertures, base strips mounted in parallel relation, such base strips having ventilating openings disposed in a row near one side of the strip with locking tabs one at each side of each opening and with inverted channel shaped cover members for each row of ventilating openings, such channel shaped cover members having their edges turned inwardly and disposed upwardly to form troughs at each side of the same, and over which edges of the channel members the tabs on the base strips are bent for fastening the parts in assembled relation. The frame member is of adjustable length and is supported by adjustable side members so that the awning can be readily attached without special fastening elements.

With continued reference to the drawings, the awning of the present invention includes a mounting bar 10, and a frame member including a front section 11 and side sections 12 and 13. Base strips 14 and channel shaped cover members 15 complete the awning.

The mounting bar 10 has a flange 16 by means of which it may be attached to a supporting structure such, for example, as the window frame 17 of a window 18 over which the awning is to be attached by means of screws or fasteners 19.

In order to fasten the base strips 14 to the mounting bar 10, the latter is provided with pairs of transversely arranged, uniformly spaced, aligned apertures 20, and the base strips 14 are provided with corresponding pairs of attaching tabs 21. These tabs are inserted through the apertures of the mounting bar and are bent back parallel to the mounting bar as shown in Fig. 3.

In order to secure the base strips 14 to the front and side sections 12 and 13 of the frame, the latter is provided with longitudinally arranged and longitudinally spaced pairs of slots 22 for the reception of additional pairs of tabs 23 on the base strips and which tabs are clinched in place in a similar manner to the tabs 21.

The front section 11 and side sections 12 and 13 of the frame are formed of relatively flat members having their edges bent reversely and turned inwardly and terminating in parallel spaced relation and providing hollow C-shaped channel members. These channel members are connected at their corners by right angular or L-shaped members 24 over which the front and side sections telescope. After the parts of the frame member are in adjusted position, they may be deformed by a pair of pliers or the like to provide cooperating socket and detent portions 25 and 26 respectively. In order to attach the side sections to a support, one at each side, are brackets 27, attached to the support by means of screws 28, the side sections telescoping over such members 27 and being locked in fixed relation thereto in similar manner by providing a socket 29 receiving a detent 30.

The base strips are provided with spaced ventilating openings having raised margins 31 and fastening tabs 32 one at each side of the same. The openings are disposed along the length nearer one edge than the other of the strip in a single row with the openings in each sheet aligned with the openings in the adjacent sheet, so that the raised margins, which deter the flow of water therethrough, have their sides in alignment. The base strips each have a slightly raised longitudinal edge 14' and are placed side by side with each raised edge along the raised sides of the row of openings in the next adjacent base strip.

The cover members 15 are utilized for covering each row of ventilating openings, one cover member for each row of openings. Each cover member is channel shaped with an imperforate main body portion and with side portions 33 provided with elongated openings 34, said side portions having inwardly disposed raised extremities 35 corresponding to the raised marginal portions of the ventilating openings. The raised extremities 35 of the cover member are engaged by the fastening tabs 32 on the base strips which not only hold the cover member in position over the openings, but bind the overlying edge of the adjacent base strip to the underlying base strip. A flashing strip 36 having an upturned edge 37 for engaging a support and a downturned edge 38 for engaging the cover member 15 is employed.

The side sections 12 and 13 of the frame member have base strips 14 attached vertically thereto. The tabs 21 of the base strips are locked through the slots of the side sections and the upper ends of the base strips are cut at an angle to conform to the angular pitch of the roof and they are fastened together and reinforced at their upper angular ends by tongs 39 on the upper ends of the base strips. These tongs extend into openings 40 of any desired shape in an L-shaped strip one at each side of the awning, and each L-shaped strip having a depending side or portion 41 and a horizontal side or portion 42, the openings 40 being located in the angle between the sides 41 and 42. Over these L-shaped reinforcing and connecting members is mounted a finishing strip 43 having an upturned inner edge 44 and a downwardly turned outer edge 45. This strip is held in position by the flashing strip at its upper end and by the cover members along its inner edge.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. An awning comprising a plurality of base strips each having one edge portion projecting upwardly, ventilating openings formed in each of said base strips through the portion of said base strip adjacent the other edge thereof, each of said openings having a tongue portion at each side, each of said base strips being substantially a duplicate of each other, a plurality of such base strips adapted to be positioned in side by side substantially abutting relation, a plurality of inverted channel shaped cover strips having flange portions extending upwardly at an angle corresponding to the angle of the edge portions of the base strips, said channel shaped cover strips being of a size to cover the ventilating openings of one of said base strips and a flange portion of an adjacent base strip, said cover strips being held in position on said base strips and said base strips being held in abutting relation by the tabs at the side edges of said openings whereby a unitary structure of great width may be assembled from base strips and cover channel strips of small widths.

2. An awning comprising a series of base strips disposed in side by side relation, each base strip having a series of longitudinally disposed ventilating openings, each series of openings in said base strip adapted to be covered by a single cover member, a series of cover members each overlying the ventilating openings in one base strip and the adjacent edges of two of said base strips, each of said base strips being substantially a duplicate of each other, and fastening means securing said cover members on said base strips and securing adjacent base strips together so that each cover member overlies the openings of its immediate underlying base strip and a portion of one immediately adjacent base strip.

References Cited in the file of this patent
UNITED STATES PATENTS

| | | |
|---|---|---|
| 2,307,272 | Houseman | Jan. 5, 1943 |
| 2,484,987 | Eschrich | Oct. 18, 1949 |
| 2,565,294 | Bain | Aug. 21, 1951 |
| 2,569,388 | Rogers et al. | Sept. 25, 1951 |
| 2,648,105 | Kurtz | Aug. 11, 1953 |